(12) United States Patent
Kimura

(10) Patent No.: US 8,005,307 B2
(45) Date of Patent: Aug. 23, 2011

(54) DECODING APPARATUS, DECODING METHOD, COMPUTER READABLE MEDIUM STORING PROGRAM THEREOF, AND COMPUTER DATA SIGNAL

(75) Inventor: Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1119 days.

(21) Appl. No.: 11/727,527

(22) Filed: Mar. 27, 2007

(65) Prior Publication Data

US 2008/0013839 A1  Jan. 17, 2008

(30) Foreign Application Priority Data

Jul. 14, 2006  (JP) ................................ 2006-193947

(51) Int. Cl.
G06K 9/33 (2006.01)
H04N 7/12 (2006.01)
(52) U.S. Cl. .................... 382/233; 375/240.29
(58) Field of Classification Search .......... 382/164–167, 382/232–233, 274, 305, 312, 250, 251, 252, 382/254, 260, 275; 375/240.24, 240.29, 375/240.03, 240.2, 240.25, 240.27, 245; 704/221, 224, 226, 230; 348/240.25
See application file for complete search history.

(56) References Cited

U.S. PATENT DOCUMENTS

| | | | | |
|---|---|---|---|---|
| 5,471,248 A | * | 11/1995 | Bhargava et al. | 375/240.24 |
| 5,890,120 A | * | 3/1999 | Haskell et al. | 704/271 |
| 7,227,901 B2 | * | 6/2007 | Joch et al. | 375/240.29 |
| 7,734,105 B2 | * | 6/2010 | Strom et al. | 382/239 |
| 2004/0228535 A1 | * | 11/2004 | Honda et al. | 382/233 |

FOREIGN PATENT DOCUMENTS

| | | |
|---|---|---|
| JP | A-05-014735 | 1/1993 |
| JP | A-05-316361 | 11/1993 |
| JP | A-07-170512 | 7/1995 |
| JP | A-10-322702 | 12/1998 |
| JP | A 11-220631 | 8/1999 |
| JP | A-2005-311785 | 11/2005 |

OTHER PUBLICATIONS

Notification of Reasons for Refusal issued in Japanese Patent Application No. 2006-193947; mailed Oct. 19, 2010; with English-language translation.
Japanese Patent Office, *Notification of Reasons for Refusal for Patent Application No. 2006-193947* (with English translation), mailed Jan. 6, 2011, pp. 1-4 (pp. 1-7 for translation).

\* cited by examiner

*Primary Examiner* — Kanji Patel
(74) *Attorney, Agent, or Firm* — Oliff & Berridge, PLC

(57) ABSTRACT

This invention provides a decoding apparatus including an intensity setting unit that sets a modification intensity based on modified image information and a modification unit that modifies decoded image information with an intensity set by the intensity setting unit.

8 Claims, 15 Drawing Sheets

IMAGE

TRANSFORM COEFFICIENTS
(DCT COEFFICIENTS)

BLOCKS ENTAILED IN FILTERING

PIXELS TO BE FILTERED

CORNER PIXELS

REFERENCE RANGE

FILTERING INTENSITY a

NON-CORNER PIXELS

REFERENCE RANGE

FILTERING INTENSITY a $$\max Sq_1 = \max_{u,v}\left\{\frac{|S_{vu}(n,m)|}{Q_{vu}}\right\}$$

$$\begin{cases} newa = \dfrac{a_1 - a_0}{maxSq_1 - maxSq_0} \times (ThOpt - maxSq_0) + a_0 \\ ThOpt = (ThMax + ThMin)/2 \end{cases}$$

FIG.9A $\quad E = \dfrac{a}{4}[B+C+D-3A]+A$

FIG.9B $\quad E = \dfrac{a}{2}[B-A]+A$

FIG.9C $\quad \max Sq_1 = \max\limits_{u,v}\left\{\left|\dfrac{S_{vu}(n,m)}{Q_{vu}} - Sq_{vu}(n,m)\right|\right\}$ Sq$_{vu}$(n,m) represents quantized indices used in decoding process.

FIG.11A $$\begin{cases} \text{If } \alpha > 0.5 - \text{ThMax} & \alpha = 0.5\text{-ThMax} \\ \alpha < -0.5 + \text{ThMax} & \alpha = -0.5+\text{ThMax} \end{cases}$$

FIG.11B $$\max Sq_1 = \max_{u,v}\left\{\frac{S_{vu}(n,m)}{Q_{vu}}\right\}$$

FIG.11C $$\begin{cases} \text{maxSq}_1 + \alpha < \text{ThMax and maxSq}_1 + \alpha > \text{ThMin} \\ \text{or} \\ \text{maxSq}_1 + \alpha > \text{- ThMax and maxSq}_1 + \alpha < \text{- ThMin} \end{cases}$$

DECODING APPARATUS, DECODING METHOD, COMPUTER READABLE MEDIUM STORING PROGRAM THEREOF, AND COMPUTER DATA SIGNAL

CROSS-REFERENCE TO RELATED APPLICATIONS

This application is based on and claims priority under 35 USC 119 from Japanese Patent Application No. 2006-193947 filed Jul. 14, 2006.

BACKGROUND

Technical Field

The present invention relates to a decoding apparatus, a decoding method, a computer readable medium storing a program thereof for decoding coded data generated by an encoding process, and a computer data signal embodied in a carrier wave for enabling a computer to perform a process for decoding. Particularly, the present invention relates to a decoding apparatus, a decoding method, a computer readable medium storing a program, and a computer data signal embodied in a carrier wave for dequantizing and decoding coded data generated by an encoding process including data quantization.

SUMMARY

According to an aspect of the present invention, there is provided a decoding apparatus including an intensity setting unit that sets a modification intensity based on modified image information and a modification unit that modifies decoded image information with an intensity set by the intensity setting unit.

BRIEF DESCRIPTION OF THE DRAWINGS

An exemplary embodiment of the present invention will be described in detail based on the following figures, wherein:

FIGS. 9A, 9B, and 9C provide equations which are used in a modification example 2;

FIGS. 11A, 11B, and 11C illustrate processing for complying with a quantization range limitation;

DETAILED DESCRIPTION

Figure 1:
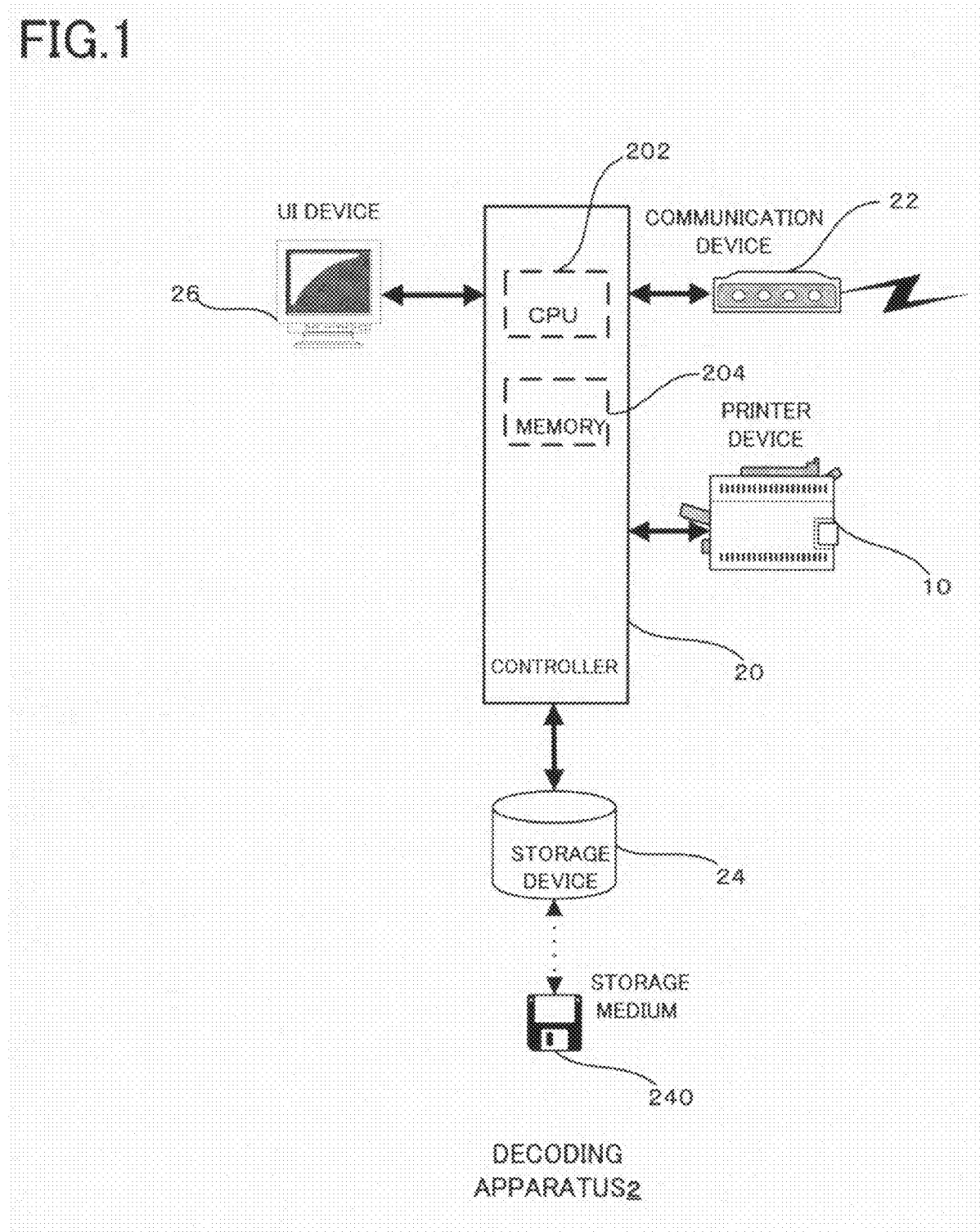
FIG. 1 illustrates a hardware structure of a decoding apparatus 2 to which a decoding method of the present invention is applied, with a controller 20 being positioned in the center.

To help understanding of the present invention, its background and overview are first discussed.

A variety of methods for improving the image quality of an image artifacted by block by block transform encoding such as JPEG have been proposed. As an image quality improvement technique, for example, a method of suppressing artifacts by low-pass filtering block artifacts is commonly used. This method is intended to suppress blocking artifacts by low-pass filtering, specifically, the boundaries of DCT coded blocks. Since, if all boundaries of blocks are filtered, high frequency components to be preserved are lost, filtering is arranged to filter only data compressed at a high compression ratio.

This method cannot cope with artifacts of an image in which blocks in some portions should be filtered, whereas blocks in other portions should not be filtered.

Then, a method using plural low-pass filters is conceivable, which determines for every block whether an edge is present in an image and, for a block with an edge, chooses and applies a filter not to smooth the edge. For example, if it is determined that a vertical edge is present from a zero coefficient distribution over DCT coefficients, a low-pass filtering to preserve the vertical edge is applied.

Alternatively, the filter coefficient of a low-pass filter is changed according to the value of a quantization step size.

In such a method that determines for every block whether an edge is present and applies filtering to suppress blocking artifacts, the following problems exist.

Because of changeover between a filter for a block with an edge and a filter for a block without an edge, a rapid change in image quality occurs between one block that reaches a threshold for edge judgment and another block that is lower than the threshold.

It would be reasonable for greatly compressed data that better image quality is obtained by suppressing blocking artifacts, while even smoothing edges, because blocking artifacts become larger with a higher compression ratio. That is, it would be reasonable that an overall image quality can be further improved by determining whether or not a filter is applied, taking account of a tradeoff between the image quality improvement effect of suppressing blocking artifacts and the image quality degradation effect of smoothing of originally existing edges. In the above method in question, however, filtering is selected only depending on whether an edge is present.

In another method in which a filter is changed according to a compression ratio or a compression parameter, as noted above, a high-intensity filter may be applied to an image originally having many edges, resulting in that the edges become smooth.

Thus, a decoding apparatus 2 in the present exemplary embodiment realizes blocking artifact suppression in which rapid change in quality between blocks is avoided and an optimal filter can be applied for each block of an image adaptively to edge components of an image and a compression parameter.

[Hardware Structure]

First, a hardware structure of the decoding apparatus 2 in the present exemplary embodiment is described.

FIG. 1 illustrates the hardware structure of the decoding apparatus 2 to which a decoding method of the present invention is applied, a controller 20 being positioned in the center.

As illustrated in FIG. 1, the decoding apparatus 2 is composed of the controller 20 including a CPU 202, a memory 204, and other components, a communication device 22, a storage device 24 such as a HDD/CD unit, and a user interface (UI) device 26 including a LCD or CRT display, a keyboard, a touch panel, and the like.

The decoding apparatus 2 is, for example, a general-purpose computer in which a decoding program 5 (described below) has been installed and which acquires coded data via the communication device 22, the storage device 24, or the like, decodes the acquired coded data, and transfers decoded data to the printer device 10.

[Decoding Program]

Figure 2:
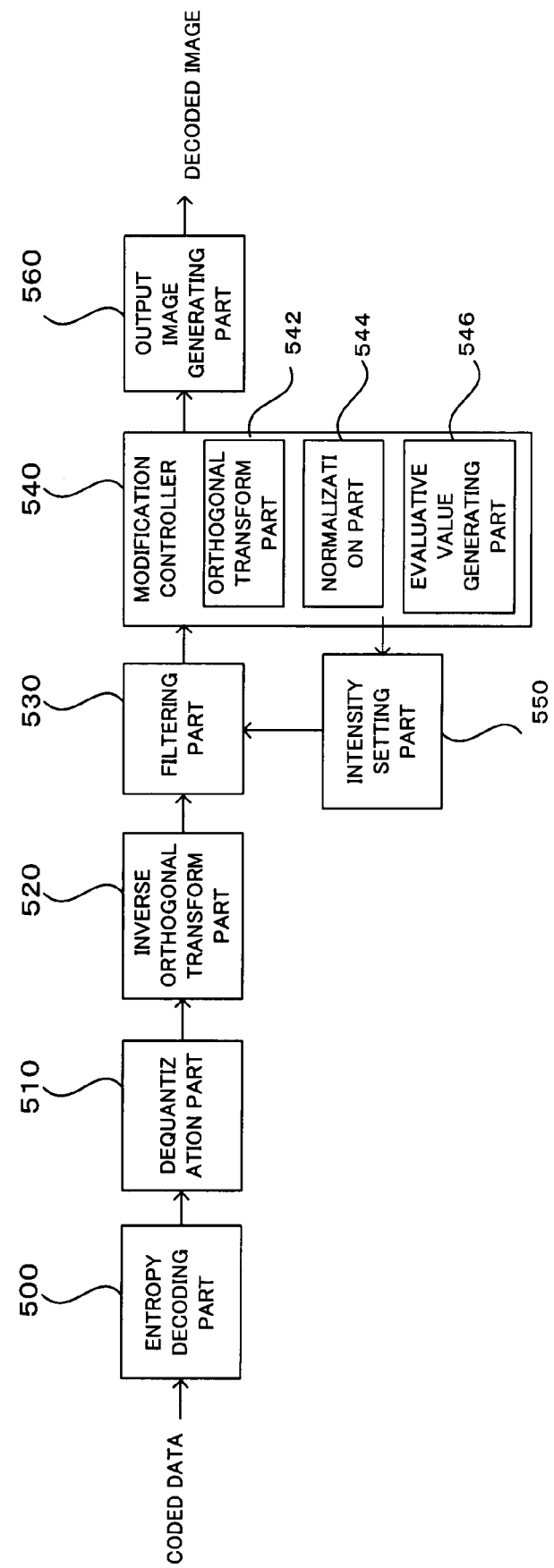
FIG. 2 illustrates a functional structure of a decoding program 5 embodied in a computer readable medium for realizing the decoding method of the present invention when executed by the controller 20 (FIG. 1)

FIG. 2 illustrates a functional structure of the decoding program 5 embodied in a computer readable medium for realizing the decoding method of the present invention when executed by the controller 20 (FIG. 1).

As illustrated in FIG. 2, the decoding program 5 includes an entropy decoding part 500, a dequantization part 510, an inverse orthogonal transform part 520, a filtering part 530, a modification controller 540, a intensity setting part 550, and an output image generating part 560. The modification controller 540 includes an orthogonal transform part 542, a normalization part 544, and an evaluative value generating part 546.

In the decoding program 5, the entropy decoding part 500 entropy decodes input coded data and outputs decoded symbols to the dequantization part 510.

The entropy decoding part 500 of this example decodes input JPEG coded data in accordance with an international standard JPEG scheme, generates quantized indices, and outputs the generated quantized indices to the dequantization part 510.

The dequantization part 510 generates dequantized values based on the quantized indices input from the entropy decoding part 500 and outputs the generated dequantized values to the inverse orthogonal transform part 520.

The dequantization part 510 of this example dequantizes the quantized indices input from the entropy decoding part 500, according to the width of a quantization domain (quantization step size), generates DCT coefficients, and outputs the generated DCT coefficients to the inverse orthogonal transform part 520.

The inverse orthogonal transform part 520 inverse orthogonally transforms the dequantized values input from the dequantization part 510 and outputs the generated decoded image pixel values to the filtering part 530. The pixel values, dequantized values (DCT coefficients), and quantized indices are all concrete examples of image information relevant to the present invention.

The inverse orthogonal transform part 520 of this example performs an inverse discrete cosine transform (IDCT) on the DCT coefficients input from the dequantization part 510, generates decoded image pixel values, and outputs the generated pixel values to the filtering part 530.

The filtering part 530 modifies the decoded image pixel values input from the inverse orthogonal transform part 520 with a given modification intensity and outputs the modified pixel values to the modification controller 540.

The filtering part 530 of this example low-pass filters only the marginal pixels within a block made up of 8×8 pixels in the decoded image input from the inverse orthogonal transform part 520, using a modification coefficient set by the intensity setting part 550 and outputs the low-pass filtered decoded image to the modification controller 540.

The modification controller 540 determines whether the decoded image needs remodification, based on the decoded image pixel values input from the filtering part 530. If determining that the decoded image needs remodification, the modification controller 540 instructs the intensity setting part 550 to change the modification intensity. If determining that the decoded image does not need remodification, the modification controller 540 outputs the decoded image pixel values input from the filtering part 530 to the output image generating part 560.

The modification controller 540 of this example urges the intensity setting part 550 to update the filtering coefficient and urges the filtering part 530 to modify the decoded image with the updated filtering coefficient until alterations in the decoded image resulting from the modification by the filtering part 530 fulfill a given condition.

More specifically, the orthogonal transform part 542 orthogonally transforms (DCT in this example) the decoded image input from the filtering part 530 and generates the thus transformed transform coefficients (altered DCT coefficients in this example).

The normalization part 544 normalizes the transform coefficients (DCT coefficients in this example) transformed by the orthogonal transform part 542, according to the width of a quantization domain (quantization step size).

The evaluative value generating part 546 generates, as an evaluative value, a maximum of or a mean of transform coefficients (alteration of DCT coefficients in this example) normalized by the normalization part 544. Here, the maximum or mean of the transform coefficients is, for example, a maximum or mean of plural coefficients included in each of the blocks for which DCT processing is performed.

Then, the modification controller 540 determines whether the evaluative value (a maximum or mean of transform coefficients) generated by the evaluative value generating part 546 falls within a given target range. If the evaluative value falls within the target range, the modification controller 540 outputs the decoded image (decoded image and alterations before modified) input from the filtering part 530 to the output image generating part 560. If the evaluative value does not fall within the target range, the modification controller 540 instructs the intensity setting part 550 to update the filtering coefficient and instructs the filtering part 530 to perform filtering with the updated filtering coefficient.

The intensity setting part 550 sets a modification intensity in response to an instruction from the modification controller 540 and instructs the filtering part 530 to perform a modification applying the set modification intensity.

The intensity setting part 550 of this example changes the filtering coefficient to make the evaluative value fall within the target range and instructs the filtering part 530 to perform filtering with the changed filtering coefficient.

The output image generating part 560 generates an output image based on the image information input from the modification controller 540.

The output image generating part 560 of this example generates an output image (decoded image) based on the decoded image (before filtered) and transformed values (alterations made by filtering) input from the modification controller 540.

Next, the above structure and its operation are described in further detail.

Before a detailed description, preparations are provided here.

Figure 3A:
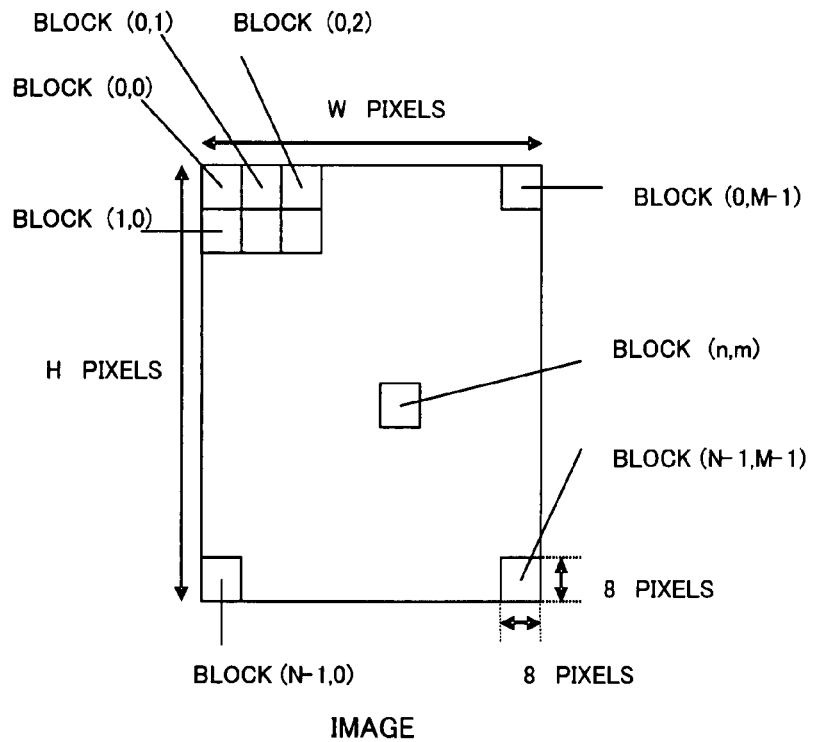
FIGS. 3A and 3B illustrate pixel blocks and transform coefficients.

In JPEG encoding, an image signal is divided into blocks each having 8×8 pixels and processing is performed block by block, as illustrated in FIG. 3A. As indicated in FIG. 3A, an index m is used to indicate a horizontal position of an 8×8 block. The number of horizontally arranged blocks in an image is denoted by M. The blocks are assigned block numbers m=0, 1, ... M−1 in order from the left in the horizontal direction.

Also as indicated in FIG. 3A, an index n is used to indicate a vertical position of an 8×8 block. The number of vertically arranged blocks in an image is denoted by N. The blocks are assigned block numbers n=0, 1, ... N−1 in order from the top in the vertical direction.

Each block is identified by a pair of m and n (n,m) In the parentheses, (vertical index n, horizontal index m) are described in this order.

Relations between image size W, H and the numbers of horizontal and vertical blocks M, N are given below.

$$M = W/8$$

$$N = H/8$$

Every pixel value within a block is represented by $S_{yx}(n,m)$. That is, $S_{yx}(n,m)$ indicates a pixel value of a pixel positioned at row y and column x within a block (n,m).

Figure 3B:
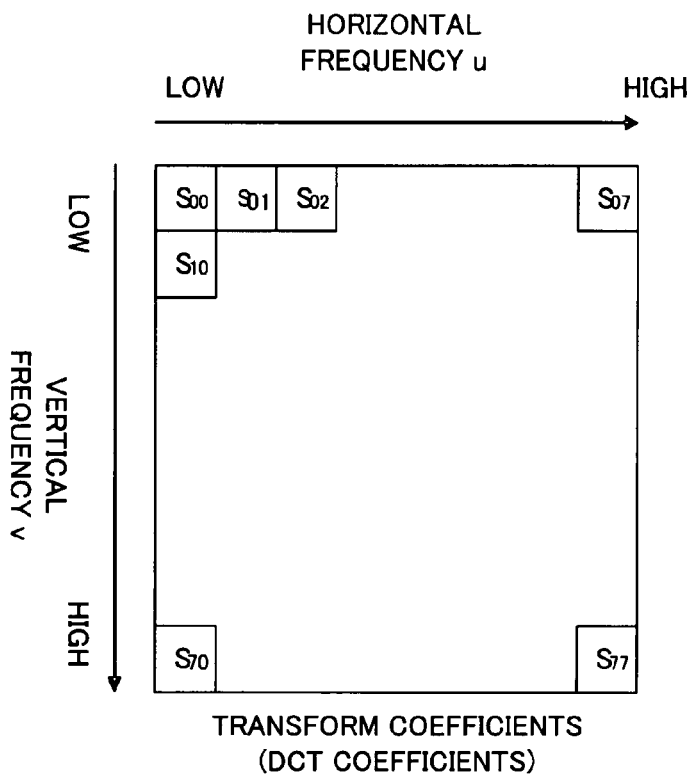

In the JPEG encoding, each block is DCTed into DCT coefficients. A DCT coefficient representing a horizontal frequency u and a vertical frequency v of a block (n,m) is defined as $S_{vu}(u,m)$. $S_{00}(n,m)$ is a DC component of a block (n,m). $S_{77}(n,m)$ is an AC component with the highest two-dimensional frequency. FIG. 3B shows DCT coefficients within one block.

A quantization step size corresponding to a horizontal frequency u and a vertical frequency v is defined as $Q_{vu}$.

A quantized DCT coefficient (quantized index) representing a horizontal frequency u and a vertical frequency v of a block (n,m) is defined as $Sq_{vu}(n,m)$. In a JPEG standard (ITU-T Rec. T.81), arithmetic expressions of $Sq_{vu}(n,m)$ are provided.

A dequantized DCT coefficient representing a horizontal frequency u and a vertical frequency v of a block (n,m) is defined as $R_{vu}(n,m)$. In the JPEG standard (ITU-T Rec. T.81), arithmetic expressions of $R_{vu}(n,m)$ are provided.

Also in the JPEG standard (ITU-T Rec. T.81), dequantized DCT coefficients $R_{vu}(n,m)$ are IDCTed (inverse discrete cosine transformed) block by block (n,m) into blocks of pixels $s_{yx}(n,m)$. Here, x and y are, respectively, numerical values ranging from 0 to 7, representing the horizontal position and the vertical position of a pixel within a block. Finally, the blocks of pixels $S_{yx}(n,m)$ are raster transformed to obtain a decoded image.

Next, processing that is performed by the decoding program 5 shown in FIG. 2 is outlined.

First, the entropy decoding part 500 of the decoding program 5 interprets input JPEG codes in accordance with the JPEG standard (ITU-T Rec. T.81) and generates quantized indices $Sq_{vu}(n,m)$. A method of calculating quantized indices is the same as described in the JPEG standard (ITU-T Rec. T.81).

The dequantization part 510 dequantizes the quantized indices $Sq_{vu}(n,m)$ and generates dequantized results $R_{vu}(n,m)$.

The inverse orthogonal transform part 520 inverse discrete cosine transforms the dequantized results $R_{vu}(n,m)$ and generates interim decoded pixel values $s^0_{yx}(n,m)$.

The filtering part 530 in conjunction with the intensity setting part 550 filters the above dequantized results $s^0_{yx}(n,m)$ at least once in response to control from the modification controller 540 and generates final decoded pixel values $s_{yx}(n,m)$ as an output image.

Next, the operations of the filtering part 530, the modification controller 540, and the intensity setting part 550 are described in further detail. In the following description, a parameter specifying a filtering coefficient, which is used in the filtering part 530, is referred to as a parameter a. That is, the intensity setting part 550 changes the intensity of filtering performed by the filtering part 530 by changing the parameter a.

When interim decoded pixel values are input to the filtering part 530, the filtering part 530 first filters the interim decoded pixel values $s^0_{yx}(n,m)$, using a default filtering parameter.

Then, the modification controller 540 judges the result of the filtering performed by the filtering part 530. If the result meets a predetermined condition, the modification controller 540 obtains blocks of pixels $s_{yx}(n,m)$ to be output, using the result of the filtering. If the result does not meet the predetermined condition, the intensity setting part 550 sets a new parameter a and instructs the filtering part 530 to perform filtering again.

The filtering part 530, the modification controller 540, and the intensity setting part 550 repeat the above operations to obtain the result of filtering meeting the predetermined condition.

In the following, detailed operations of the respective parts are explained.

[Filtering Part]

The filtering part 530 adopts a filtering manner in which it can change its low-pass characteristic depending on the parameter a (filtering intensity a).

Figure 4A:
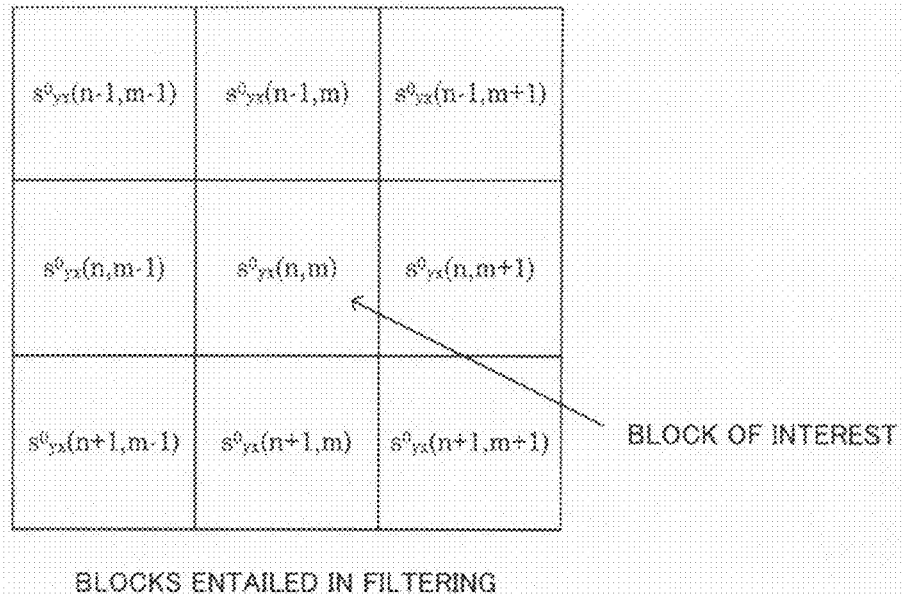
FIGS. 4A and 4B illustrate blocks entailed in filtering and target pixels to be filtered.

When filtering a block of pixels $s^0_{yx}(n,m)$, the filtering part 530 uses eight blocks of pixels $s^0_{yx}(n\pm1,m\pm1)$ surrounding this block of pixels, as illustrated in FIG. 4A.

Figure 4B:
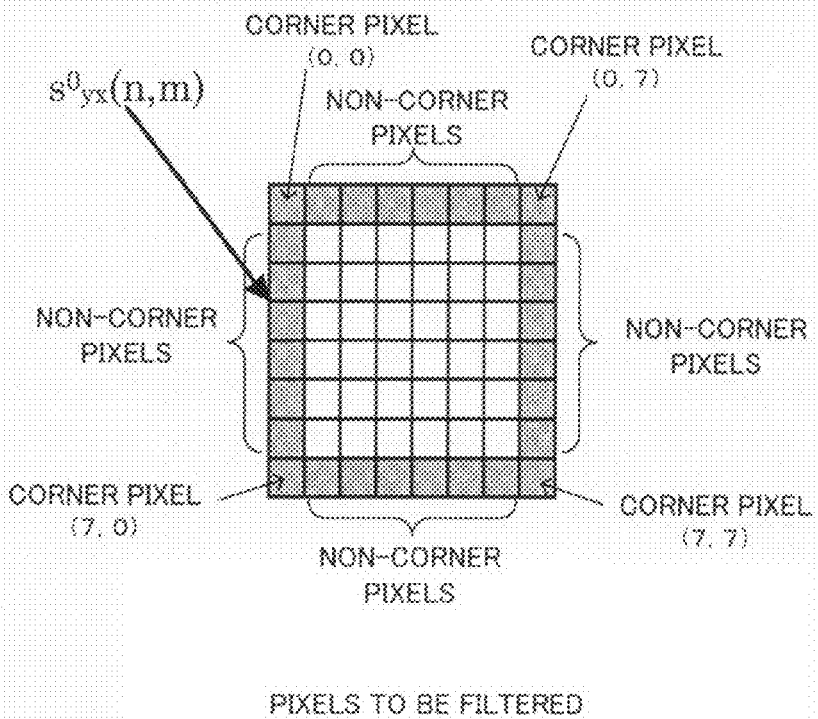

In the block of pixels $s^0_{yx}(n,m)$, the pixels to be filtered (that is, the pixels whose values are to be changed by filtering) are only the pixels on the boundaries of the block (that is, those with x,y=0 or 7), like hatched cells as indicated in FIG. 4B.

The boundary pixels are classified into the following two types:

Corner pixels: (x,y)=(0,0), (0,7), (7,0), (7,7)

Non-corner pixels: x,y=0 or 7 with the exception of the corner pixels

Figure 5A:
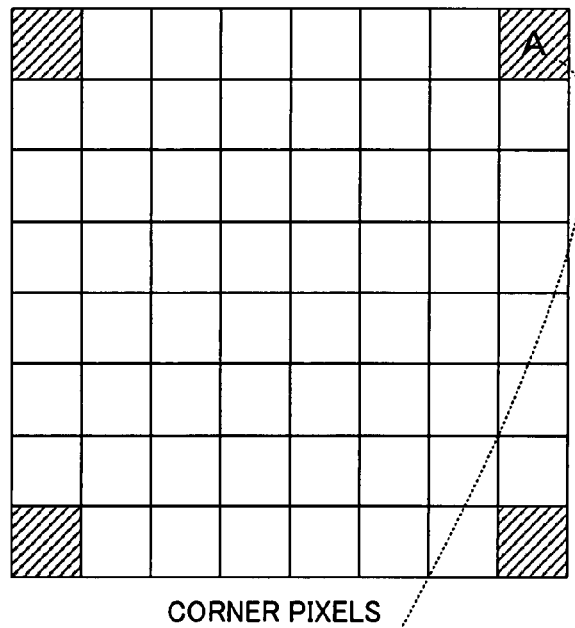
FIGS. 5A, 5B, and 5C illustrate filtering of corner pixels.
Figure 5B:
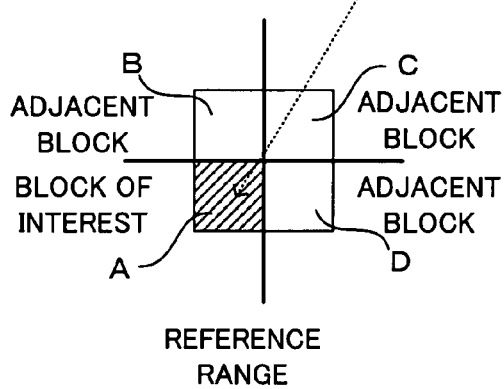

Hatched cells as indicated in FIG. 5A correspond to corner pixels. The filtering part 530 of this example filters each corner pixel, using pixels in adjacent three blocks, as illustrated in FIG. 5B.

Figure 5C:
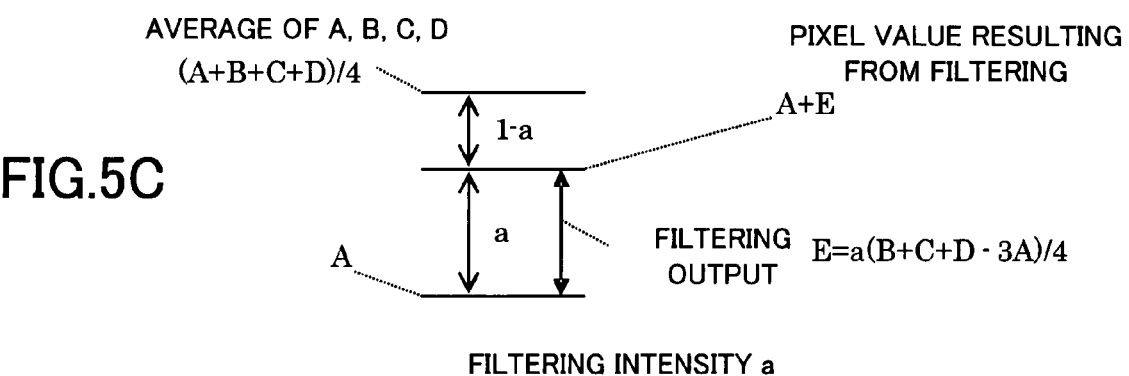

Here, if a pixel value of a corner pixel is denoted by A and pixel values of pixels in other blocks adjacent to the corner pixel are denoted by B, C, D, a filtering output E is calculated by an equation provided in FIG. 5C. Here, it should be noted that the filtering output E of a pixel is a difference from an input pixel value (an alteration made by filtering).

The equation of the filtering output E provided in FIG. 5C uses a point that internally divides the difference between an average of pixel values A, B, C, and D and the pixel value A into (1-a) and a, as a pixel value resulting from filtering. The modification intensity (i.e., the internal division point) changes depending on the value of the parameter a.

Figure 6A:
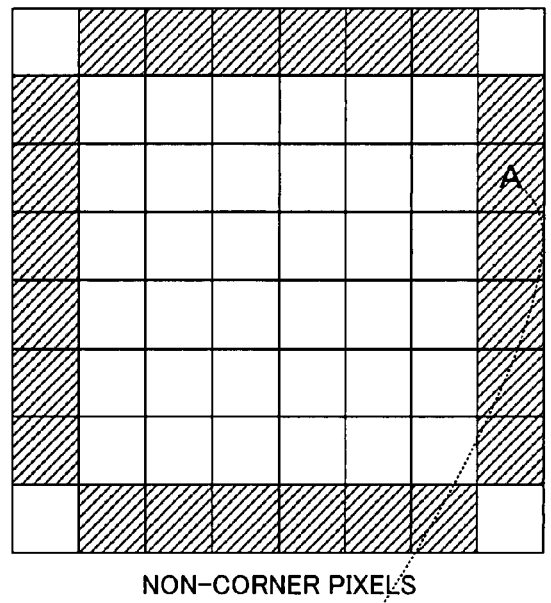
FIGS. 6A, 6B, and 6C illustrate filtering of non-corner pixels.
Figure 6B:
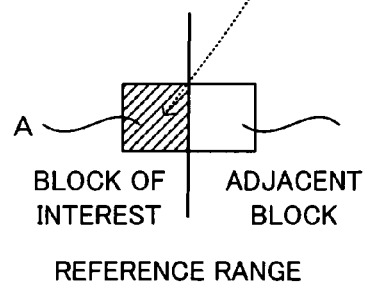

Hatched cells as indicated in FIG. 6A correspond to non-corner pixels. The filtering part 530 filters each non-corner pixel, using one pixel in an adjacent block, as illustrated in FIG. 6B. Here, if a pixel value of a non-corner pixel is denoted by A and a pixel value of a pixel in another block adjacent to the non-corner pixel is denoted by B, a filtering output E is calculated by an equation provided in FIG. 6C. Here, again, the filtering output E of a pixel is a difference from an input pixel value (an alteration made by filtering).

Figure 6C:
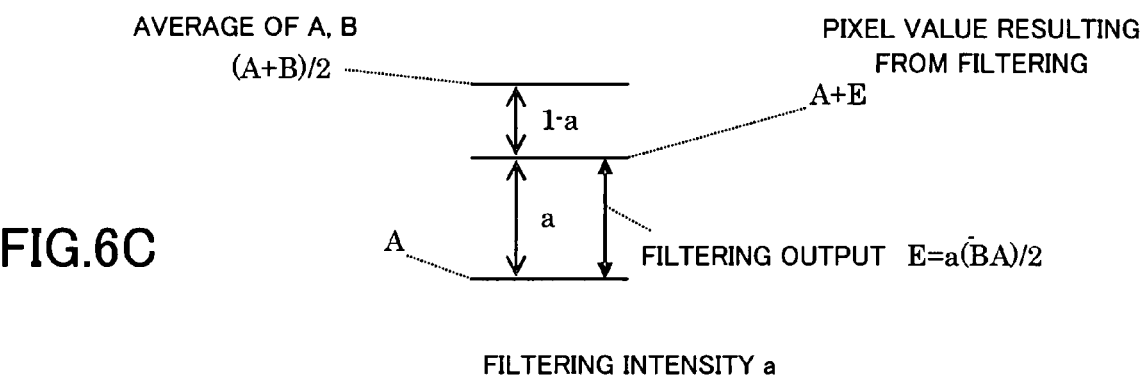

The equation of the filtering output E provided in FIG. 6C uses a point that internally divides the difference between an average of pixel values A and B and the pixel value A into (1-a) and a, as a pixel value resulting from filtering.

As described above, when the filtering part 530 filters the corner pixels and non-corner pixels, if the filtering intensity a is larger, an output image becomes rather moderate; if the filtering intensity a is smaller, the degree of removal of blocking artifacts becomes smaller.

In FIGS. 5A to 6C, examples of calculations for a corner pixel at the top right corner of a block and a non-corner pixel on the right side of the block are presented. A filtering output value for a pixel at any other position may be calculated, taking advantage of symmetry, accordingly. An output value for a pixel which is not filtered becomes 0.

The output image generating part 560 takes filtering output values E (hereinafter termed filtering difference values) as $s^1_{yx}(n,m)$ and combines interim decoded pixel values $s^0_{yx}(n,m)$ and the filtering difference values $s^1_{yx}(n,m)$ into a final output image $s_{yx}(n,m)$.

[Modification Controller]

The orthogonal transform part 542 in the modification controller 540 first discrete cosine transforms the filtering difference values $s^1_{yx}(n,m)$ obtained by the above-described filtering. DCT coefficients obtained by this DCT are denoted by $S_{vu}(n,m)$.

Figures 7A, 7B, 7C:
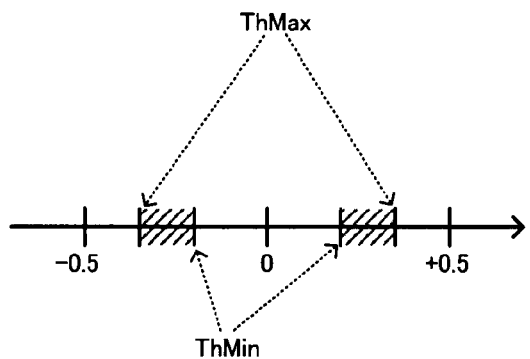
FIGS. 7A, 7B, and 7C illustrate processing by a modification controller 540 and an intensity setting part 550.

Then, the normalization part 544 and the evaluative value generating part 546 calculate a maximum normalized DCT coefficient $maxSq_1$, using an equation provided in FIG. 7A. The maximum normalized DCT coefficient $maxSq_1$ is a maximum value of normalized DCT coefficients within a block. Like this example, processing by the normalization part 544 and the evaluative value generating part 546 may be realized by use of a single equation or by use of plural equations.

Next, the modification controller 540 judges the maximum normalized DCT coefficient $maxSq_1$ (i.e., an evaluative value). For judgment of an evaluative value, threshold values ThMax and ThMin as mentioned below are set beforehand.

The modification controller 540 determines that $maxSq_1$ meets the condition if $maxSq_1 < ThMax$ and $maxSq_1 > ThMin$; otherwise, it determines that $maxSq_1$ does not meet the condition. That is, the modification controller 540 of this example determines whether the evaluative value ($maxSq_1$) falls within a target range (a hatched range in FIG. 7B) defined by the thresholds ThMax and ThMin, as illustrated in FIG. 7B. Desirably, this target range is set not to include 0 (i.e., a state of no change made by filtering) and not to exceed ±0.5 (i.e., to an extent that the filtering result does not exceed a quantization domain).

[Intensity Setting Part]

The intensity setting part 550 sets a parameter a to be used in filtering which is performed next time by use of a linear interpolation method.

First, $a_0=0$ and $maxSq_0=0$ are fixed. Then, the intensity setting part 550 fixes $a_1=$(a predetermined initial value). That is, the intensity setting part 550 sets the first filtering parameter a to $a_1$.

Next, the intensity setting part 550 calculates a filtering intensity newa by linear interpolation, using the output value (the maximum normalized DCT coefficient $maxSq_1$) from the modification controller 540, $a_0$, $a_1$, and $maxSq_0$.

Specifically, the intensity setting part 550 calculates a new filtering intensity newa, using an equation provided in FIG. 7C, where $ThOpt=(ThMax+ThMin)/2$.

For parameter setting at the second time and subsequent, the intensity setting part 550 may calculate a filtering intensity newa by the equation provided in FIG. 7C, using updated values $a_0=a_1$, $a_1=$newa, $maxSq_0=maxSq_1$, and the maximum normalized DCT coefficient ($maxSq_1$) which is calculated next time.

The modification controller 540 may take a step for convergence and stabilization to limit or stabilize the number of times of parameter setting (that is, the number of times of feedback).

For example, as a first convergence and stabilization step, when the iteration count (the number of times filtering has been performed with an updated parameter a) has reached a predetermined threshold value, the modification controller 540 activates the calculation of an output image, clearing all $s^1$ to 0.

As a second convergence and stabilization step, when an absolute value of difference between $maxSq_1$ and $maxSq_0$ has become less than a predetermined threshold value, the modification controller 540 activates the calculation of an output image using $s^1$ as is if $maxSq_1 < ThMax$; otherwise, it activates the calculation of an output image, clearing all $s^1$ to 0.

As a third convergence and stabilization step, if the iteration count is less than a given value K, the modification controller 540 determines that $maxSq_1$ meets the condition, only when the evaluative value $maxSq_1$ has fallen between the threshold ThMax and the threshold ThMin. If the iteration count is more than the given value K, the modification controller 540 determines that $maxSq_1$ meets the condition, provided that the evaluative value $maxSq_1$ is less than the threshold value ThMax. When the quantization step size of JPEG is small, DCT coefficients divided by the quantization step change greatly in contrast to a change in pixel values. Consequently, it becomes difficult that an evaluative value obtained from the DCT coefficients divided by the quantization step falls between the threshold ThMax and the threshold ThMin. Convergence may be delayed or impossible. Thus, in the third convergence and stabilization step, if the iteration count is great, measures in which the lower threshold ThMin is ignored to facilitate convergence in a stable manner are taken.

The above first to third convergence and stabilization steps may be applied in combination, when appropriate.

The intensity setting part 550 may set a filtering parameter to be used in the first filtering to a maximum assumable value (offering the greatest effect of filtering) and the modification controller 540 may determine that $maxSq_1$ meets the condition if $maxSq_1 < ThMax$ as the result of the first filtering, and may take the filtering result as it is. In this manner, it is possible to reduce the iteration count even for a moderate image in which the $maxSq_1$ value does not become so great even if the pixels are filtered by a very strong filter.

[Overall Operation]

Figure 8:
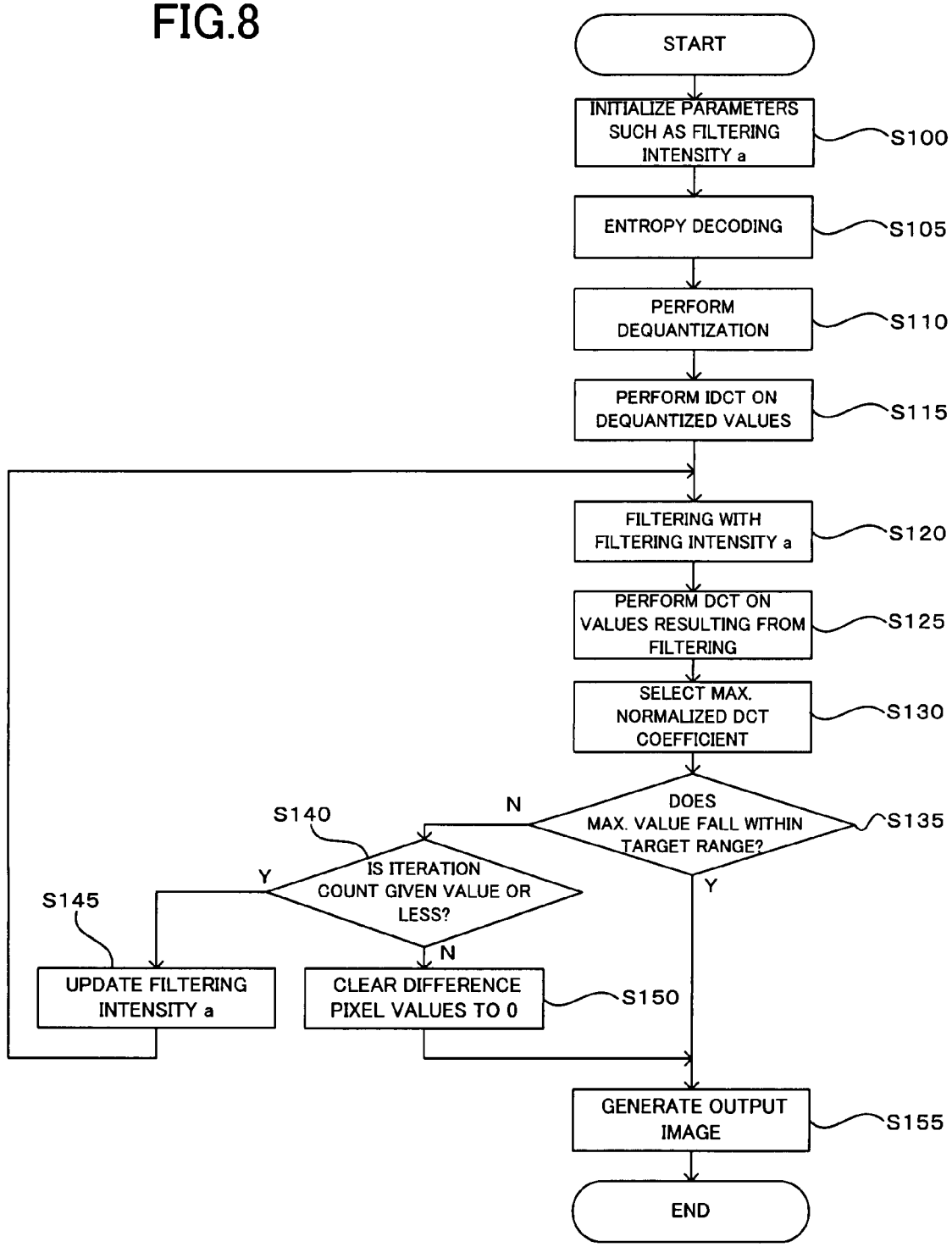
FIG. 8 is a flowchart illustrating a decoding process (S10) by the decoding program 5 (FIG. 2)

FIG. 8 is a flowchart illustrating a decoding process (S10) by the decoding program 5 (FIG. 2).

As illustrated in FIG. 8, at step 100 (S100), the modification controller 540 (FIG. 2) instructs other components to initialize parameters such as filtering intensity a when coded data is input and the components of the decoding program 5 initializes the parameters.

At step 105 (S105), the entropy decoding part 500 (FIG. 2) decodes the input coded data by a Huffman coding scheme and outputs decoded quantized indices to the dequantization part 510.

At step 110 (S110), the dequantization part 510 dequantizes the quantized indices input from the entropy decoding part 500, generates DCT coefficients, and outputs the generated DCT coefficients to the inverse orthogonal transform part 520.

At step 115 (S115), the inverse orthogonal transform part 520 performs IDCT on the DCT coefficients input from the dequantization part 510, generates interim decoded pixel values $s^0_{yx}(n,m)$, and outputs the generated interim decoded pixel values $s^0_{yx}(n,m)$ to the filtering part 530.

At step 120 (S120), the filtering part 530 filters the interim decoded pixel values $s^0_{yx}(n,m)$ input from the inverse orthogonal transform part 520, using the parameter a (filtering intensity a) set by the intensity setting part 550, calculates filtering output values $s^1_{yx}(n,m)$ (filtering difference values), and outputs the calculated filtering difference values $s^1_{yx}(n,m)$ to the modification controller 540. For the first filtering, the initial parameter a (default value) is set by the intensity setting part 550. For the second and subsequent filtering, the parameter a changed by the intensity setting part 550 is set at S145.

At step 125 (S125), the orthogonal transform part 542 in the modification controller 540 discrete cosine transforms the filtering difference values $s^1_{yx}(n,m)$ input from the filtering part 530 and generates DCT coefficients $S_{vu}(n,m)$.

At step 130 (S130), the normalization part 544 and the evaluative value generating part 546 calculate a maximum normalized DCT coefficient $maxSq_1$ (i.e., an evaluative value) from the DCT coefficients $S_{vu}(n,m)$ for each block supplied from the orthogonal transform part 542, using the equation provided in FIG. 7A.

At step 135 (S135), the modification controller 540 determines whether the calculated evaluative value (maximum normalized DCT coefficient $maxSq_1$) falls within a range (target range) between the thresholds ThMax and ThMin. If the evaluative value falls within the target range, the modification controller 540 outputs the interim decoded pixel values $s^0_{yx}(n,m)$ and the filtering difference values $s^1_{yx}(n,m)$ to the output image generating part 560.

The decoding program 5 proceeds to step S155 if the evaluative value falls within the target range or proceeds to step S140 if the evaluative value does not fall within the target range.

At step 140 (S140), the modification controller 540 determines whether the iteration count (that is, the number of times the parameter a has been updated) is less than a given value.

The decoding program 5 proceeds to step S145 if the iteration count is less than the given value or proceeds to step S150 if the iteration count exceeds the given value.

At step 145 (S145), the modification controller 540 outputs the maximum normalized DCT coefficient $maxSq_1$ to the intensity setting part 550 and instructs the intensity setting part 550 to update the parameter a (filtering intensity a).

The intensity setting part 550 calculates a filtering intensity newa by the equation provided in FIG. 7C, using the maximum normalized DCT coefficient $maxSq_1$ input from the modification controller 540, sets the calculated filtering intensity newa as the filtering intensity a, and provides it to the filtering part 530.

The decoding program 5 returns to step S120 when a new filtering intensity a is set by the intensity setting part 550 and carries out filtering using this filtering intensity a.

At step 150 (S150), the modification controller 540 clears all filtering difference values $s^1_{yx}(n,m)$ to 0 and outputs the interim decoded pixel values $s^0_{yx}(n,m)$ and the filtering difference values $s^1_{yx}(n,m)$ to the output image generating part 560. That is, when the iteration count exceeds the given value, the decoding program 5 generates an output image in which the modifications made by the filtering part 530 are nullified and forcibly terminates the process.

At step 155 (S155), the output image generating part 560 combines the interim decoded pixel values $s^0_{yx}(n,m)$ and the filtering difference values $s^1_{yx}(n,m)$ into an output image $s_{yx}(n,m)$.

As explained above, the decoding apparatus 2 in the present exemplary embodiment determines whether an evaluative value resulting from filtering falls within a target range for each block and repeats filtering intensity updating and filtering until the evaluative value falls within the target range. Thereby, filtering optimal for removal of blocking artifacts can be performed for each block of an image.

The present decoding apparatus 2 is capable of improving the quality of an image adaptively for different image types and variation in a compression parameter by setting a filtering intensity.

Modification Example 1

Next, examples of modifications to the foregoing exemplary embodiment are described.

Any filtering manner may be used, provided that the filtering intensity can be changed by a parameter input, and is not limited to the filter illustrated in the foregoing exemplary embodiment.

For example, although only the pixels on the block boundaries are filtered in the foregoing exemplary embodiment, the pixels to be filtered do not have to be limited to those on the block boundaries. All pixels within a block may be filtered or pixels within a distance of two pixels from the block boundaries may be filtered.

For example, as a filter different from that in the foregoing exemplary embodiment, the applied filter may be defined as a two-dimensional Gaussian filter with variance a, where a is filtering intensity.

However, because it may be necessary to change the filtering intensity block by block, a block and its adjacent block are not always filtered with the same filtering. Consequently, a relation between pixel values may be reversed due to filtering intensity difference between blocks.

For example, as shown in FIG. 6B, assume that pixel values A, B which are adjacent on a block boundary have a relation that A<B. There is a possibility that A changes to A' by filtering the pixel A and B changes to B' by filtering the pixel B; as a result, the relation changes to A'>B'. Such reversal of a relation between pixel values adversely affects the image quality.

Thus, in the first modification example, filtering is controlled so that the filtered pixel values on a block boundary do not exceed an intermediate value between the pixels on the block boundary ((A+B)/2 with regard to the above example).

Modification Example 2

Although filtering different values (alterations made by filtering) are calculated as filtering outputs in the foregoing exemplary embodiment, the filtering outputs are not limited to those values.

Then, the filtering part 530 of the second modification example applies filtering in which filtering outputs are pixel values.

When filtering corner pixels, the filtering part 530 of the present modification example uses plural pixel values A to D as illustrated in FIGS. 5A and 5B, as is the case for the foregoing exemplary embodiment; however, a different equation is used to calculate a filtering output E. Specifically, the filtering part 530 of the present modification example calculates a filtering output E of filtering a pixel value A of a corner pixel, using an equation provided in FIG. 9A. The filtering output E in this case is an actually filtered pixel value, not a difference (an alteration made by filtering).

In the present modification example also, parameter a is a coefficient that specifies a filtering intensity and the equation provided in FIG. 9A uses a point that internally divides the difference between an average of pixel values A, B, C, and D of corner pixels and the pixel value A of the target corner pixel to be filtered into (1-a) and a, as a pixel value resulting from filtering.

When filtering non-corner pixels, the filtering part 530 of the present modification example uses one pixel (pixel value B) in an adjacent block as illustrated in FIGS. 6A and 6B and calculates a filtering output E by an equation provided in FIG. 9B.

In this case also, the equation provided in FIG. 9B uses a point that internally divides the difference between an average of pixel values A and B and the pixel value A into (1-a) and a, as a pixel value resulting from filtering.

When filtering is performed as noted above, if the filtering intensity a is larger, an output image becomes rather moderate; if the filtering intensity a is smaller, the degree of removal of blocking artifacts becomes smaller.

In the present modification example, the output image generating part 560 can take the filtering output E obtained by the above-noted filtering directly as an output image.

In the present modification example, however, the modification controller 540 operates differently. In particular, the normalization part 544 and the evaluative value generating part 546 calculate a maximum normalized DCT coefficient $maxSq_1$, using an equation provided in FIG. 9C, which differs from the foregoing exemplary embodiment. In the equation provided in FIG. 9C, $Sq_{vu}(n,m)$ represents quantized indices initially input to the decoding apparatus 2.

With the exception of using the equation for calculating a maximum normalized DCT coefficient $maxSq_1$, the operation of the modification controller 540 can be the same as described in the foregoing exemplary embodiment.

In this way, in the present modification example, quantized indices $Sq_{vu}(n,m)$ needs to be preserved, which differs from the foregoing exemplary embodiment. Instead, it is not necessary to add $s^0_{yx}(n,m)$ when calculating $s_{yx}(n,m)$

Modification Example 3

Although a maximum normalized DCT coefficient is used as an evaluative value for evaluating the filtering result in the foregoing exemplary embodiment, a mean normalized DCT coefficient may be used as an evaluative value.

Then, the modification controller 540 (the normalization part 544 and the evaluative value generating part 546) in the third modification example calculates a mean normalized DCT coefficient $meanSq_1$ in addition to the maximum normalized DCT coefficient $maxSq_1$.

In this case, the modification controller 540 makes a judgment using the mean normalized DCT coefficient $meanSq_1$. However, if the maximum normalized DCT coefficient $maxSq_1 > 0.5$, the modification controller 540 determines that the evaluative value does not meet the condition. This condition is added to comply with a quantization range limitation so that input quantized index values do not change. Specifically, by controlling DCT coefficients $S_{vu}(n,m)$ so that $maxSq_1$ will be 0.5 or less, JPEG codes identical to input JPEG codes can be obtained when the DCT coefficients $S_{vu}(n,m)$ are quantized again, if a calculation error effect is ignored. This limitation is referred to as a quantization range limitation in the following description.

If the quantization range limitation is ignored, the decoding program 5 may calculate only $meanSq_1$.

Modification Example 4

Although quantized indices are directly dequantized to generate a decoded image in the foregoing exemplary embodiment, quantized indices are filtered and modified and pixels of an image decoded from the modified quantized indices are filtered by the filtering part 530 in the fourth modification example.

Figure 10:
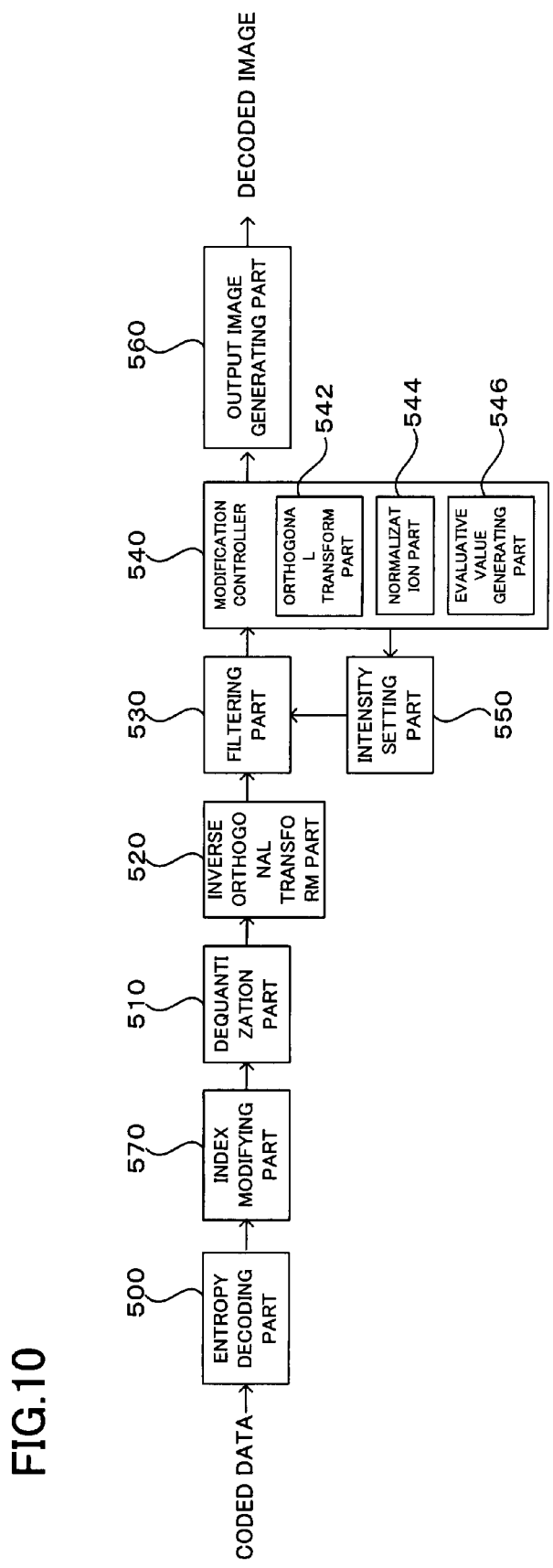
FIG. 10 illustrates a structure of a second decoding program 52.

FIG. 10 illustrates a structure of a decoding program 52 in the fourth modification example. Components shown in this figure which are substantially the same as those shown in FIG. 2 are assigned the same reference numbers.

As illustrated in FIG. 10, the decoding program 52 of this modification example has a structure in which an index modifying part 570 is added to the decoding program 5 shown in FIG. 2.

The index modifying part 570 takes input of quantized indices $Sq_{vu}(n,m)$ and calculates modified values α of the quantized indices. Modified values α of the quantized indices within a block of interest are calculated, using quantized indices in corresponding positions of frequency components within other blocks adjacent to the block of interest.

In this case, the dequantization part 510 dequantizes quantized index values modified (namely, $Sq_{vu}(n,m)+α$) by the index modifying part 570. Other operations are the same as described in the foregoing exemplary embodiment.

If compliance with the quantization range limitation is assumed, the index modifying part 570 further performs processing as provided in FIG. 11A. Instead of the processing in FIG. 11A, the modification controller 540 may calculate $maxSq_1$ by an equation provided in FIG. 11B and determine whether $maxSq_1+α$ meets conditions provided in FIG. 11C.

[Experiment Results]

Image quality improvement effects of the foregoing exemplary embodiment or the modification examples are described based on experiment results.

First, basic conception of the foregoing exemplary embodiment or the modification examples is presented below.

(1) Because blocking artifacts are high-frequency components occurring on the boundaries of blocks, the blocking artifacts can be removed by low-pass filtering pixels on the boundaries of blocks.

(2) It becomes possible to remove more blocking artifacts by applying strong filtering (suppressing the high-frequency components to a great degree).

(3) Because a greatly compressed image has larger blocking artifacts, it is better to apply stronger filtering.

(4) However, filtering with a great filtering intensity removes high-frequency components (edge components) that originally exit in an image and poses a problem in which the filtering degrades the image quality negatively.
(5) Strong filtering is better for an image compressed at a high compression ratio or an image having noticeable blocking artifacts. Moderate filtering is better for an image compressed at a low compression ratio or an image having less blocking artifacts.
(6) Moderate filtering is better for an image in which many edge components exist originally. Strong filtering may be used for an image in which fewer edge components exist originally.

In the foregoing exemplary embodiment or the modification examples, a filter to which an intensity of suppressing high-frequency components can be input as a parameter is prepared and the above parameter is adjusted on a block-by-block basis across an image.

Here, the most problem is how to adjust the filtering parameter (filtering intensity). The filtering intensity should change depending on several factors such as image properties (edges are present or not), a compression ratio, and a compression parameter.

In the foregoing exemplary embodiment or the modification examples, the above factors are converted into a single criterion and the adjustment of the filtering intensity a is made very simple and robust.

In particular, the filtering intensity is adjusted by setting a filtering intensity so that a maximum of normalized DCT coefficients across an image, which corresponds to a filtering difference value, falls within a predetermined value range.

This effect is presented with the following experiment results.

Experiments are conducted under the following conditions.
(1) Nine images, images 1 to 9, are used.
(2) Quality parameter values of JPEG are compressed to five values 5, 10, 20, 40, 80 and decoded.
(3) Decoding is performed by a standard JPEG scheme.
(4) After filtering with a filtering intensity a, an image quality improvement effect (PSNR[dB]) is measured from an image quality (PSNR) of the standard JPEG scheme.
(5) Filtering intensity a is set in three manners: "Fixed", "Adjusted based on the maximum value", and "Adjusted based on the mean value". "Adjusted based on the maximum value" means that filtering is controlled so that a maximum normalized DCT coefficient across a block falls within a range from Tx to Ty (where y=x+1). "Adjusted based on the mean value" means that filtering is controlled so that a mean normalized DCT coefficient across a block falls within a range from tx to ty (where y=x+1).

Experiment results are presented below.

Figure 12:
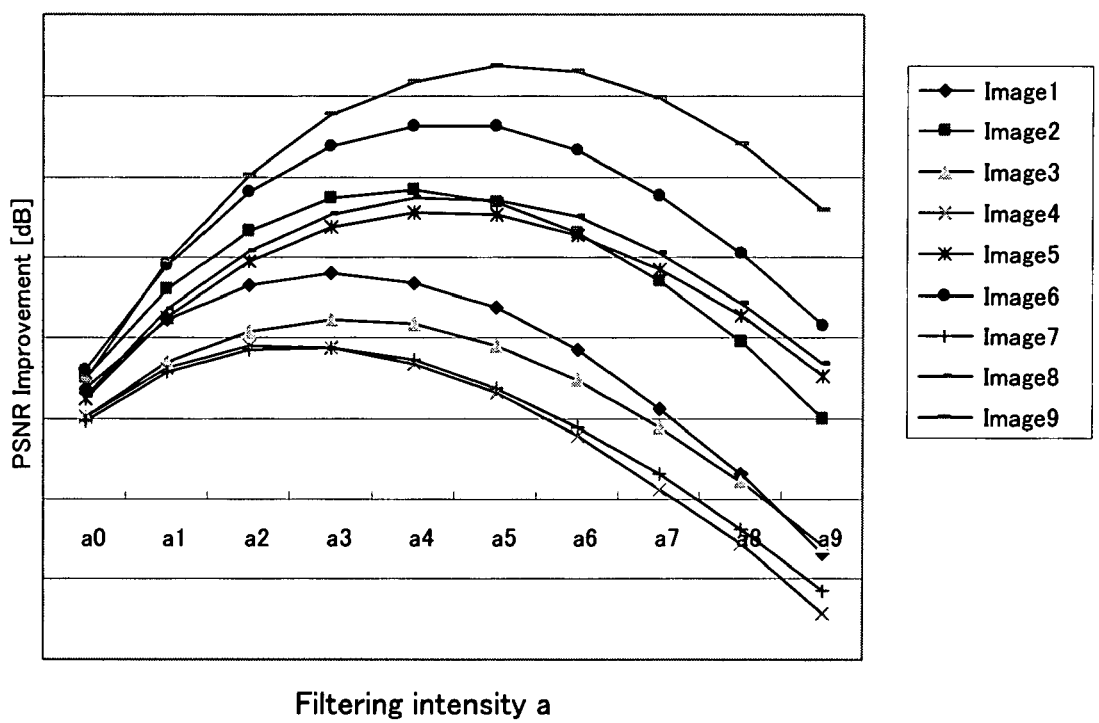
FIG. 12 is a graph (plotted per image) showing image quality improvement effects when fixed values of filtering intensity are used.
Figure 13A:
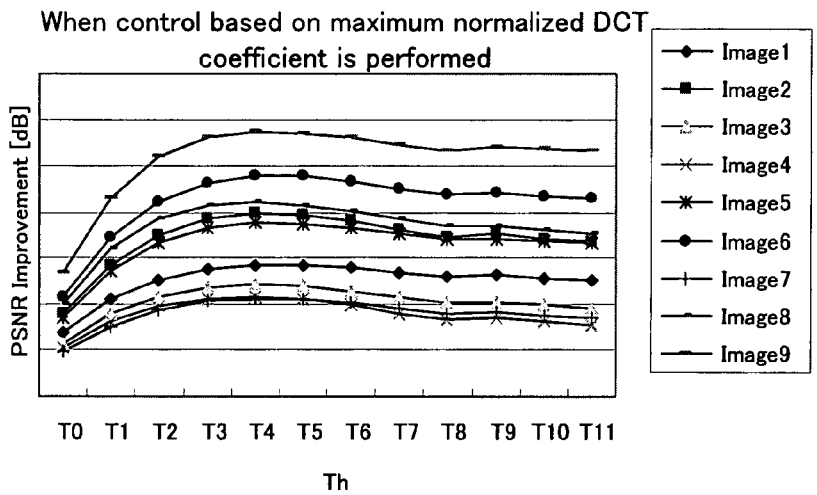
FIGS. 13A and 13B are graphs (plotted per image) showing image quality improvement effects when plural threshold values are set and filtering intensity is adjusted based on a maximum or mean normalized DCT coefficient.
Figure 13B:
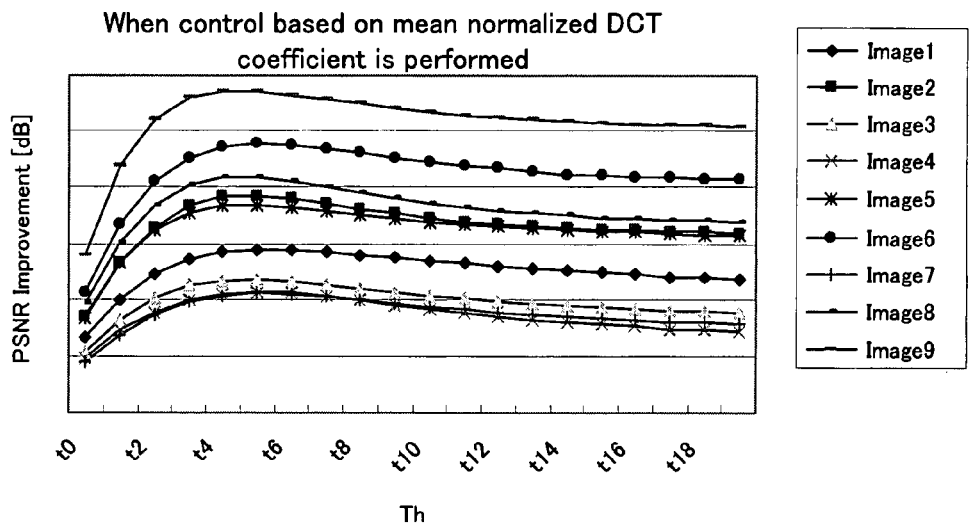

FIGS. 12A, 13A and 13B are graphs showing the image quality improvement effects of encoding and decoding of five JPEG quality parameter values which are 5, 10, 20, 40, 80 (an average of the results obtained for five quality parameter values) for each image. Specifically, FIG. 12 shows the image quality improvement effects when fixed values (a0 to a9) of filtering intensity are used. FIG. 13A shows the image quality improvement effects when plural threshold values (T0 to T11) are set and the filtering intensity is adjusted based on a maximum normalized DCT coefficient. FIG. 13B shows the image quality improvement effects when plural threshold values (t0 t 18) are set and the filtering intensity is adjusted based on a mean normalized DCT coefficient.

Figure 14:
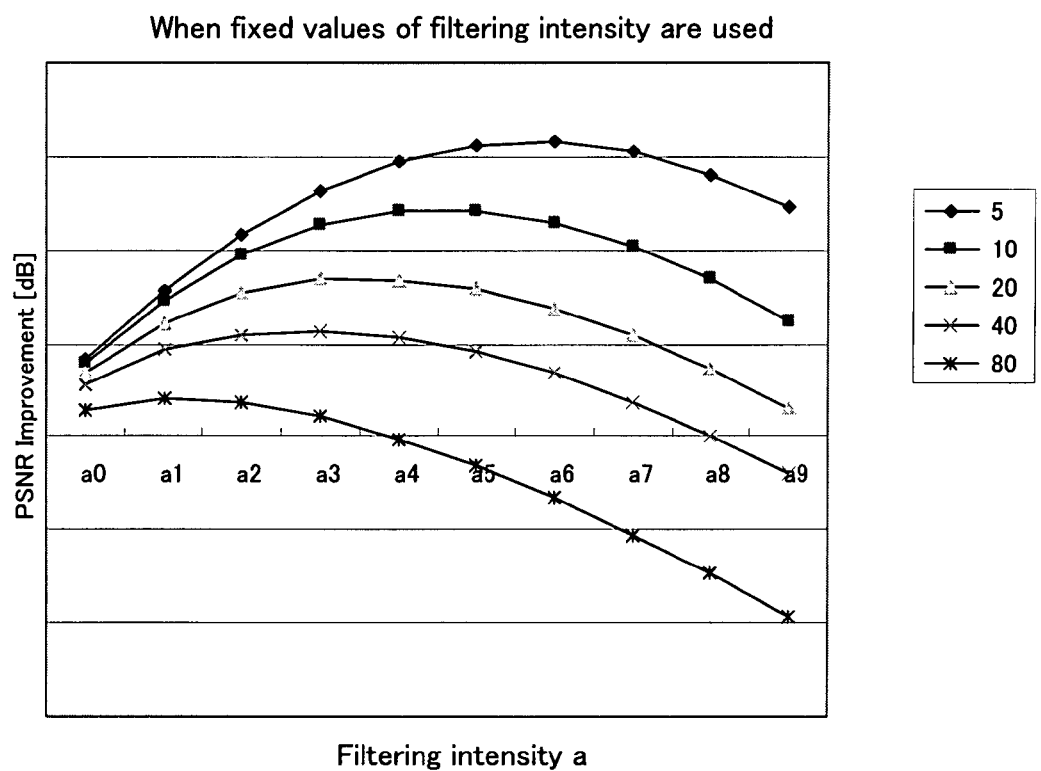
FIG. 14 is a graph (plotted per compression parameter value) showing image quality improvement effects when fixed values of filtering intensity are used.
Figure 15A:
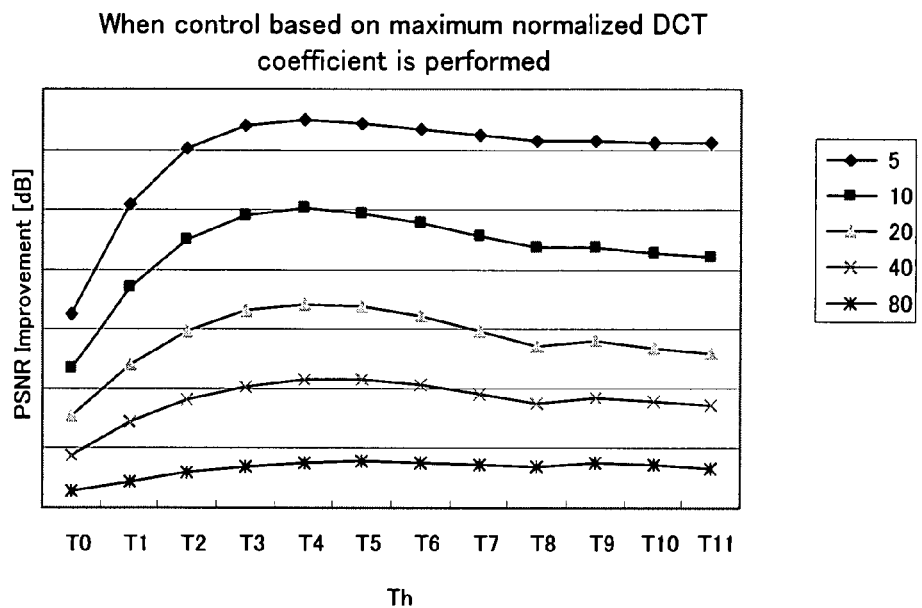
FIGS. 15A and 15B are graphs (plotted per compression parameter value) showing image quality improvement effects when plural threshold values are set and filtering intensity is adjusted based on a maximum or mean normalized DCT coefficient.
Figure 15B:
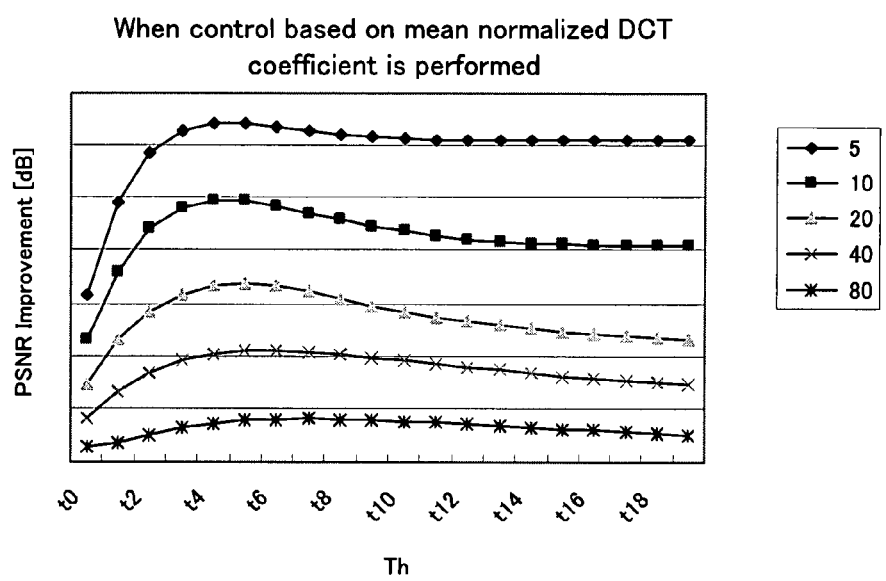

FIGS. 14, 15A and 15B are graphs showing the image quality improvement effects of encoding and decoding of nine images (an average of the results obtained for nine images) for each of the five JPEG quality parameters (5, 10, 20, 40, 80). Specifically, FIG. 14 shows the image quality improvement effects when fixed values (a0 to a9) of filtering intensity are used. FIG. 15A shows the image quality improvement effects when plural threshold values (T0 to T11) are set and the filtering intensity is adjusted based on a maximum normalized DCT coefficient. FIG. 15B shows the image quality improvement effects when plural threshold values (t0 to t18) are set and the filtering intensity is adjusted based on a mean normalized DCT coefficient.

As can be seen from FIGS. 12 and 14, when fixed values of the filtering intensity are used, the optimal filtering intensity a differs from one image to another. It can be seen that strong filtering is better for one image, whereas strong filtering on another image affects the image quality negatively. In FIG. 12, for example, for an image 4 which is a relatively moderate image, high-intensity filtering may be applied. For an image 7 having relatively many edges, high-intensity filtering results in a degradation in the image quality.

When fixed values of the filtering intensity are used, the optimal filtering intensity value a differs depending on compression parameter. In FIG. 14, for example, for a compression parameter value (e.g., 5) of a low image quality, a high filtering intensity is desirable. For a compression parameter value (e.g., 80) of a high image quality, a low filtering intensity is desirable.

As can be seen from FIGS. 12 and 14, it is difficult to set a fixed filtering intensity that provides satisfactory results for all images and all compression parameter values.

As cam be seen from FIGS. 13A, 13B, 15A and 15B, when the filtering intensity a is adjusted using the maximum normalized DCT coefficient or mean normalized DCT coefficient, the image quality can be maximized independent of an image over a substantially equal number of threshold values Th.

Moreover, the image quality can be maximized independent of a compression parameter as well over a substantially equal number of threshold values Th.

Specifically, if the threshold is set at or around T4 or t4, substantially optimal filtering can be performed on most images and with most compression parameter values when the maximum normalized DCT coefficient or mean normalized DCT coefficient is used.

The most benefit of the foregoing exemplary embodiment or the modification examples is that image quality can be maximized independent of an image or compression parameter as noted above.

Additionally, in similar methods of related art, filter change is performed based on edge extraction from an image or filter change is performed according to a quantization step size of quantizing input codes. In such cases, it is very difficult to determine whether a relation between the edge amount and a filter is satisfactory or whether a relation between the quantization step size and a filter is satisfactory. In the foregoing exemplary embodiment or the modification examples, alterations of quantized indices are simply bounded within a range and, therefore, there is a merit in which the effect on image quality are easy to measure directly.

The present invention may be embodied in other specific forms without departing from its spirit or characteristics. The described exemplary embodiment is to be considered in all respects only as illustrated and not restrictive. The scope of the invention is, therefore, indicated by the appended claims rather than by the foregoing description. All changes that come within the meaning and range of equivalency of the claims are to be embraced within their scope.

What is claimed is:

1. A decoding apparatus, comprising:
an intensity setting unit that sets a modification intensity based on modified image information;
a modification unit that modifies decoded image information with an intensity set by the intensity setting unit; and
a controller that exerts control to repeat an intensity setting which is performed by the intensity setting unit and a modification which is performed by the modification unit, until image information modified by the modification unit fulfills a given condition,
wherein the intensity setting unit sets a modification intensity based on the image information modified by the modification unit and a target range set within a quantization domain applied in an encoding process.

2. The decoding apparatus according to claim 1,
wherein the target range is set to an extent not including quantized values in each quantization domain; and
the intensity setting unit sets a modification intensity so that the image information modified by the modification unit falls within the target range.

3. The decoding apparatus according to claim 2, further comprising:
a normalization unit that normalizes each of a plurality of modified image information pieces according to a width of the quantization domain; and
an evaluative value generating unit that generates a maximum value or a mean value of the plurality of image information pieces normalized by the normalization unit,
wherein the intensity setting unit sets a modification intensity so that an evaluative value generated by the evaluative value generating unit falls within the target range.

4. The decoding apparatus according to claim 3, further comprising:
a transform coefficient generating unit that orthogonally transforms a modified image in each of blocks having a given size and generates transform coefficients,
wherein the normalization unit normalizes the transform coefficients generated by the transform coefficient generating unit,
the evaluative value generating unit generates a maximum value or a mean value of normalized transform coefficients for every one of the blocks, and
the intensity setting unit sets for every one of the blocks a modification intensity based on the maximum value or the mean value generated per block.

5. The decoding apparatus according to claim 1,
wherein the modification unit low-pass filters decoded pixel values; and
the intensity setting unit sets a modification intensity by changing a filtering coefficient of the low-pass filtering.

6. The decoding apparatus according to claim 1,
wherein the modification unit modifies only pixels on margins of each of the blocks, in units of which an image is encoded.

7. A decoding method, comprising:
modifying decoded image information;
determining whether the modified image information meets a given condition;
setting a modification intensity based on the image information if the modified image information does not meet the given condition;
modifying the decoded image information with the set intensity; and
repeating the setting of the modification intensity and the modifying of the decoded image information with the set intensity until it is determined that the modified image information meets the given condition, wherein the setting of the modification intensity is based on the decoded image information modified with the set intensity and a target range set within a quantization domain applied in an encoding process.

8. A non-transitory computer readable medium storing a program causing a computer to execute a process for decoding, the process comprising:
modifying decoded image information;
determining whether the modified image information meets a given condition;
setting a modification intensity based on this image information if the modified image information does not meet the given condition;
modifying the decoded image information with the set intensity; and
repeating the setting of the modification intensity and the modifying of the decoded image information with the set intensity until it is determined that the modified image information meets the given condition, wherein the setting of the modification intensity is based on the decoded image information modified with the set intensity and a target range set within a quantization domain applied in an encoding process.

* * * * *